Oct. 6, 1942.　　　　　J. W. MAY　　　　　2,298,143
RECLOSING CIRCUIT INTERRUPTER
Filed Dec. 19, 1941
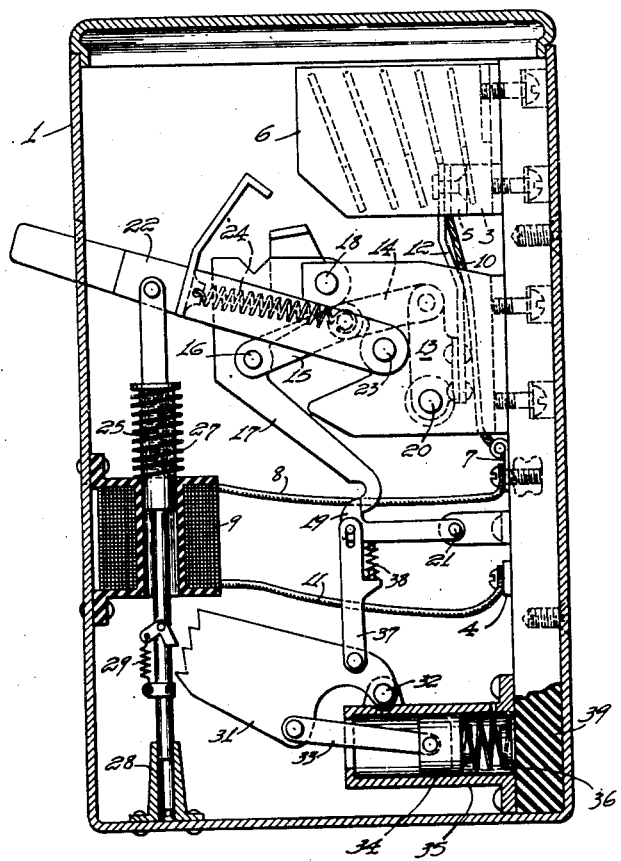
WITNESSES:
INVENTOR
John W. May.
BY
F. W. Lyle.
ATTORNEY Patented Oct. 6, 1942

2,298,143

UNITED STATES PATENT OFFICE 2,298,143

RECLOSING CIRCUIT INTERRUPTER

John W. May, Pittsburgh, Pa., assignor to Westinghouse Electric & Manufacturing Company, East Pittsburgh, Pa., a corporation of Pennsylvania Application December 19, 1941, Serial No. 423,635

3 Claims. (Cl. 200—89)

My invention relates to circuit breakers and, in particular, relates to automatically reclosing circuit breakers. For certain types of service, such, for example, as rural electrification, it is desirable to have a circuit interrupter which shall trip open when an overload or short-circuit occurs on the line and which shall automatically reclose itself after a short interval. The reason for this is that by merely relieving the line from connection to a voltage source for a short period, many types of short-circuit or overload, such, for instance, as the arc-over across an insulator, will disappear quickly, and it is possible to resume service to customers by mere reclosure of the circuit breaker. On the other hand, for such types of service as are mentioned above, it is usually an unwarranted expense to maintain attendance by power line employes to quickly reclose every circuit breaker tripped out, since some of these circuit breakers are located at points on the line remote from the power station; hence a circuit breaker which automatically recloses is desirable.

On the other hand, there are certain types of short-circuit or overload which will not disappear when the line has been cut off from the voltage source, and in such cases it would be ruinous to the circuit breaker if it were to repeatedly and for any long-continued period of time go through its tripping and reclosing cycle automatically. Hence it is desirable that, after the occurrence of a few tripping and reclosing operations in immediate succession to each other, the circuit breaker should be permanently opened to disconnect the line from the power source.

Circuit breakers arranged to carry out such functions as are described above are known in the art, but they are, in general, complicated and expensive pieces of apparatus. For rural electrification service, one of the prime requirements is that the device shall be relatively free from mechanical complications and liability to get out of order through continued service.

One object of my invention is, accordingly, to provide a circuit breaker of the type described above which shall be relatively simple and of low cost.

Another object of my invention is to provide a circuit breaker of the above-described type which can utilize circuit breaker mechanisms which have been already developed for large scale manufacture for ordinary non-automatic reclosing service.

Still another object of my invention is to furnish a circuit breaker of the type described above which shall involve only relatively simple mechanisms and mechanical devices which have little liability to get out of order in service and which can be readily repaired by operatives without a high degree of mechanical training.

Other objects of my invention will become apparent upon reading the following specification taken in connection with the drawing in which the single figure is a view, partly in section and partly in elevation, of a circuit breaker embodying the principles of my invention.

Referring in detail to the drawing, an enclosing box or container 1, which may be of insulating material if desired, but which I prefer to make of metal, contains the elements of a circuit breaker of the type described in Dorfman et al. patent No. 2,044,157, issued June 16, 1936, and assigned to Westinghouse Electric & Manufacturing Company of East Pittsburgh, Pennsylvania, assignee of my present application, together with the elements of a mechanism for tripping and automatically reclosing the circuit breaker a predetermined number of times and thereafter permanently opening the circuit breaker until it is manually reset. The elements of the circuit breaker described in the above-mentioned patent appear, in general, in the upper half of the container, and the elements of the automatic reclosing device appear in the lower half of the container.

Current may be conducted into the container 1 through the conventional conduit connections, one side of the line being connected within the container to a stationary terminal 3 of the circuit breaker and the other side of the line being connected to a terminal member 4 within the container. The path of current through the circuit breaker is from the contact 3 to the movable contact 5, thence through a flexible lead 6 to a terminal block 7 and a second lead 8 to a solenoid 9, and through another lead 11 to the contact block 4. The contact elements 3 and 5 are housed within an arc-extinguishing structure of a conventional type which forms no part of the present invention and hence need not be more fully described here. The movable contact 5 is mounted upon a resilient arm 12 supported on a link 13 which turns upon a stationary pivot 20 fixed relative to the container 1. The free end of the link 13 is pivoted to a link 14, which, in turn, is pivoted to a second link 15, the latter turning upon a pivot 16 which remains stationary relative to the container 1 until the circuit breaker is tripped by an overload, as will later appear more fully. The pivot 16 is carried by an arm 17 which turns upon a pivot 18 having a fixed support relative to the box 1. The free end of the arm 17 forms one member of a latch, the other member 19 of which turns upon a pivot 21 having a fixed relation to the container 1. As long as the current through the circuit breaker does not exceed a predetermined normal value, the free end of the arm 17 is held in stationary engagement with the latch 19, but is released from engagement therewith upon the occurrence of an overload in the line through the circuit breaker, as will be more fully described below.

A circuit breaker operating arm 22 has a pivot 23 which is supported in fixed relation to the container 1 and extends through a slot in the cover of the container 1. A spring 24 is connected between a suitable point on the arm 22 and the bearing pin which interconnects the links 14 and 15. When the circuit breaker is in its closed circuit position, that shown in the drawing, the arm 22 is so positioned relative to the links 14, 15 that the spring 24 tends to rotate link 14 in a clockwise direction about its pivot, but suitable stop members prevent the links 14, 15 rotating in this direction beyond the point at which they are shown in the drawing. It will be seen that the links 14, 15 constitute a toggle tending to hold the movable contact 5 into engagement with the stationary contact 3 so long as the arm 17 is held in the position shown in the drawing by the latch member 19. When it is desired to open the circuit breaker manually, the handle 22 is moved in a counterclockwise direction about the pivot 23, thus displacing the spring 24 to such a position that it pulls the pivot pin of the toggle link 15 counterclockwise in the drawing, thereby breaking the toggle 14, 15 and rotating the arm 12 about the pivot 20 to open the circuit breaker. The circuit breaker is reclosed by moving the handle clockwise to the position shown in the drawing, whereupon the spring 24 again pulls the toggle 14, 15 to the position shown in the drawing, rotating the arm 12 about the stationary pivot 20 to close the contact 5 into engagement with the contact 3.

It will be observed that the spring 24 thus biases the circuit breaker to its closed circuit position and likewise biases the handle 22 to the position shown in the drawing whenever the circuit breaker is closed. It will likewise be observed that the current through the circuit breaker passes through the solenoid 9 which has a core 25 of magnetic material and that this line current through the solenoid 9 tends to draw the core 25 toward the left in the drawing. The core 25 is likewise provided with a spring 27 which tends to oppose the pull on it of the solenoid 9. The core 25 is pivotally connected to the handle 22 at one end, and is provided with a slide bearing 28 supported on the casing 1 at its other end. The number of turns in the solenoid 9 is so proportioned that at the full load current which it is desired to permit to flow continuously in the line governed by the circuit breaker, the solenoid 9 does not exert force enough on the core 25 to move the handle 22 substantially from the closed circuit position shown in the drawing. On the other hand, when the current through the circuit breaker exceeds this predetermined desired value, the solenoid 9 is so proportioned that the force on the core 25 is sufficient to overcome the bias of springs 27 and 24 and to move the handle 22 counterclockwise to its circuit-opening position. The circuit breaker is thereby opened in the manner which has already been described.

An extension from the core 25 carries a pawl 29 pivoted thereon which engages the teeth of a plate 31 which is pivotally supported at 32 stationary relative to the container 1. The plate 31 is attached by a pivoted link 33 to the piston 34 of a dashpot 35 which may be of the air type, this dashpot being arranged to permit the plate 31 to move readily in a counterclockwise direction, but to permit it to be rotated only slowly in a clockwise direction under the influence of a bias spring 36. Such dashpots are well known in the art and require no further description. The plate 31 is likewise connected by a pivoted link 37 having a slotted engagement at its free end with the latch member 19, a spring 38 being provided to bias the latch member 19 in a clockwise direction about its pivot 21.

The entire assembly mentioned above is supported out of electrical connection with the container 1 by an insulating block 39.

As has been previously stated, the occurrence of an overload current flow through the circuit breaker will cause the solenoid 9 to attract the core 25 in a direction downward in the drawing, and the pawl 29 will cause the plate 31 to move counterclockwise by an angle somewhat greater than the angle between successive teeth on the plate 31. As soon as the movable contact 5 separates from the stationary contact 3 and interrupts the current flow through the circuit breaker, the solenoid 9 loses its pulling power on the core 25 and the springs 27 and 24 quickly move the core 25 to the position shown in the drawing, thereby reclosing the contacts 5 and 3. However, the plate 31 is prevented by the dashpot 35 from immediately moving to its original position. In this displaced position of the plate 31, the link 37 has moved the latch member 19 a short distance counterclockwise, but the latch member 19 and the arm 17 are so designed that this movement is insufficient to disengage the latch 19. If now the current through the circuit breaker is of normal value, the circuit breaker will remain closed. On the other hand, if the short-circuit still remains on the line, the solenoid 25 will again overcome the bias of springs 27 and 24 and move the handle 22 to reopen the circuit breaker. As a result of this second opening movement, the pawl 29 will engage the second tooth of plate 31 and move it again in a counterclockwise direction and likewise move the latch 19 still further counterclockwise along the edge of the engaging surface on arm 17. The latch 19 and member 17 are, however, so designed that this second displacement of the latch 19 is still insufficient to cause disengagement between them.

The process just described of successive reclosings and displacements of the plate 31 and latch member 19 will occur as long as the short-circuit or overload continues on the line until the latch 19 is moved so far to the left in the drawing that it slips off the edge of the arm 17. When this occurs, the member 17 will move clockwise about its pivot 18 under the stress of the spring 24 acting on the knee of the toggle links 14, 15. The movable contact 5 will be rotated in a counterclockwise direction about the pivot 20 to open the circuit breaker. The cessation of current flow through the solenoid 9 can in no way act to rotate the arm 17 counterclockwise to re-engage the latch 19; hence the circuit breaker remains open until a power line attendant manually moves the arm 22 counterclockwise to its open circuit position, thereby causing the spring 24 acting through link 15 to rotate the arm 17 counterclockwise into engagement with the latch 19. Once the latch 19 re-engages the arm 17, the biasing effects of springs 24 and 27 will pull the arm 22 clockwise as soon as the attendant releases the handle 22 and the circuit breaker will again be moved to its closed circuit position.

If the cause of the original overload is removed by the effect of the first or any immediately succeeding opening of the circuit-breaker the current of normal value will thereafter be insufficient to move core 25 enough to cause pawl 29 to engage the teeth of plate 31, and dashpot 35 will soon permit the plate 31 to return to its original position, i. e. that shown in the drawing.

I claim as my invention:

1. In combination with a pair of relatively movable contacts and means for connecting them into an electrical circuit, an arm rotatable about a pivot for moving one contact into engagement with the other, a pair of links having their opposite ends connected respectively to said arm and to a second arm pivoted in fixed relation relative to the other one of said contacts, a latch for normally retaining the last-mentioned arm in fixed position relative to the last-mentioned contact, a handle turning on a pivot which is fixed relative to said last-mentioned contact and connected by bias means to the knee of said toggle links, said bias means being adapted to normally hold the above-described mechanism in circuit-closing position, a current-responsive device adapted upon current overload to overcome said bias means and move said handle to separate said contacts, a pawl adapted to engage and move a ratchet upon movement of said handle to its open-circuit position, bias means provided with a time delay element arranged to return said ratchet to its undisplaced position a predetermined time after its displacement therefrom by said pawl, and connections between said ratchet means and said latching means whereby movement of said ratchet means in response to one actuation thereof by said pawl moves said latching means only a predetermined fraction of the distance necessary to disengage from said third arm.

2. In combination with a pair of relatively movable contacts and means for connecting them into an electrical circuit, an arm rotatable about a pivot for moving one contact into engagement with the other, a pair of links having their opposite ends connected respectively to said arm and to a second arm pivoted in fixed relation relative to the other one of said contacts, a latch for normally retaining the last-mentioned arm in fixed position relative to the last-mentioned contact, a handle turning on a pivot which is fixed relative to said last-mentioned contact and connected by bias means to the knee of said toggle links, said bias means being adapted to normally hold the above-described mechanism in circuit-closing position, a solenoid connected in series relation with said movable contacts, a magnetic core adapted to be attracted by said solenoid, a pivotal connection between said core and said handle, a pawl carried by said core, a ratchet adapted to be moved in successive steps by successive engagement of said pawl with the ratchet teeth upon repeated attractions of said core by said solenoid, bias means provided with a time delay dashpot adapted to move said ratchet to its original undisplaced position at a predetermined rate after displacement thereof by said pawl, a pivoted latch engaging said second arm to hold it in position in which said bias means stresses said toggle links to circuit-closing position, and a linkage between said ratchet and said latch, said ratchet, said linkage, said latch and said second arm being so proportioned that a plurality of displacements of said ratchet by said core within a time shorter than that required by said dashpot bias means to return said ratchet to undisplaced position is required to disengage said latch from said second arm.

3. A circuit interrupter comprising a pair of separable contacts, a trip-free arm adapted in undisplaced position to provide a fulcrum for a link mechanism adapted to close said circuit breaker in its closed-circuit position and to maintain said circuit breaker open in its open-circuit positon, a handle and bias means acting to stress said linkage to closed-circuit position, said handle being movable against said stress to move said circuit breaker to open-circuit position, said trip-free arm being movable to a second position wherein said bias means stresses said circuit breaker to open-circuit position, a latch for releasably retaining said trip-free arm in its first-mentioned position, current-responsive means for moving said arm against said stress to open said circuit breaker, means provided with a time delay arranged to move said latch after one energization of said current-responsive means a fraction only of the distance necessary to disengage from said trip-free arm, and bias means tending to move said latch under control of said time delay means back into its undisplaced position of engagement with said trip-free arm.

JOHN W. MAY.